July 31, 1923.

1,463,288

M. J. MINTZ

MUSIC CUE SHEET FOR MOTION PICTURES

Filed March 30, 1922

MUSICAL CUE SHEET FOR

A GUILTY CONSCIENCE

VITAGRAPH PRODUCTION

COMPILED

JOSEPH CARL BREIL

No. 1 — AT SCREENING — Selection: Prelude Deluge (St. Saens) — PLAY TILL NEXT CHANGE (¾ min.)

No. 2 — (Title) "MYSTIC INDIA" — Selection: Lakme (Delibes) — PLAY TILL NEXT CHANGE (1 min.)

No. 3 — (Title) "GILBERT THURSTAN" — Selection: Melodie (Rachmaninoff) — PLAY TILL NEXT CHANGE (2 min.)

No. 4 — (Title) "KAJRA, AN ISOLATED VILLAGE" — Selection: Orientale (Cui) — PLAY TILL NEXT CHANGE (1 min.)

No. 5 — (Action) "ROBERTS READS BIBLE" — Selection: "Consolation" (Mendelsohn) — PLAY TILL NEXT CHANGE (½ min.)

No. 6 — (Title) "WHEN ROBERTS RETURNS to Head Quarters" — Selection: "Rule Brittania" — PLAY TILL NEXT CHANGE (1 min.)

No. 7 — (Title) "HEART and FINGERS INTENT" — Selection: "Yesterday Love" (Boken) — PLAY TILL NEXT CHANGE (1 min.)

No. 8 — (Title) "SPIDERS SPIN THEIR Silken Webs" — THEME: "A song of India" (Rimsky Korsakow) — PLAY TILL NEXT CHANGE (1¼ m.)

INVENTOR

MOSES J. MINTZ

Patented July 31, 1923.

1,463,288

UNITED STATES PATENT OFFICE.

MOSES J. MINTZ, OF NEW YORK, N. Y.

MUSIC CUE SHEET FOR MOTION PICTURES.

Application filed March 30, 1922. Serial No. 548,094.

*To all whom it may concern:*

Be it known that I, MOSES J. MINTZ, a citizen of the United States, and resident of New York, in the county and State of New York, have invented certain new and useful Improvements in Music Cue Sheets for Motion Pictures, of which the following is a specification.

This invention relates to music cue sheets for use in connection with motion pictures, and it has particular relation to an improvement which I term a "Thematic music cue sheet" and which provides the musical "theme" and strains appropriate to the action and moods of the picture.

The object of my invention is to provide a simple and improved music cue sheet which will enable a musician to correctly apply the appropriate musical compositions or parts thereof; or substitutions, to meet, fit, and synchronize with each and every action or scene and every particular mood in the motion picture, and which will possess advantages in point of convenience, accuracy, adaptability, effectiveness and general efficiency.

Such music cue sheets for motion pictures are printed upon sheets of paper, in the usual manner corresponding to that of musical compositions, to be distributed by the motion picture film producing companies in conjunction with their pictures and for use in connection with the run or showing of the picture.

The music cue sheet heretofore in vogue and at present employed in connection with motion pictures merely gives a list of titles of musical compositions, as suggestions, and thus depends, for musical accompaniment to a motion picture, solely upon a given name of a musical composition, as being appropriate for a particular scene or action in the picture, which suggested titles are of but little or no value to the musician in affording a correct and appropriate musical accompaniment to all the actions and particular moods of the motion picture. Should the musician not have in his possession or in his library the compositions as suggested by name on the cue sheet as at present used, not only is there encountered the inconvenience and difficulty of procuring the suggested compositions in ample time for the showing of the picture, but also the inability to make a correct and appropriate substitution of some other composition, for the reason that the nature or mood of a musical composition cannot very well be determined solely from the title.

My improved thematic cue sheet, in lieu of depending solely upon a given name of a musical composition as being appropriate for a particular scene or action in the picture, provides a partial musical strain for each scene and action and also the entire musical composition designed for and serving as the main "theme" for the picture. My improved cue sheet thus plainly and specifically gives the musician a sufficient portion or strain of each musical composition appropriate to the respective scenes and actions and mood and theme of the picture, the actual notes thereof being imprinted on the cue sheet, and thus not only affords a correct and complete guide to the musician but enables the making of appropriate substitutions should the musician not have available the exact musical composition required, for with the improved cue sheet of my invention the indicated musical strains as provided thereon afford the musician a fitting and accurate musical mood under which he is enabled to make immediate musical substitution appropriately and correctly. The convenience and effectiveness is further enhanced, under my invention and improvements, by the provision upon the cue sheet, supplementary to the partial musical strains for each scene and action, of the correct and entire musical composition to be used as the "theme" for the picture.

My invention also involves further improvements, in that the partial musical strains for each scene and action are not only identified by title but are synchronized with the run or the showing of the picture, by indications and directions imprinted upon the cue sheet and affording a guide for the period of play of each consecutive musical strain, as well as an identification of the picture titles and actions to which the musical strains respectively relate.

The accompanying drawings show a face view of a music cue sheet embodying my invention.

Referring to the drawings, the partial musical strains adapted and appropriate to the respective scenes and actions of the picture are imprinted in successive arrangement upon the cue sheet, as indicated at 14, said strains and the complete "theme" composition, being preferably successively numbered, as, for instance, "No. 1" to "No. 8" as shown on the drawings. The cue sheet also preferably carries, for each of said strains, and the complete "theme" composition, an indication of the titles or actions of the picture to which the respective strains and "theme" relate, such as "(Title) 'Mystic India'", "(Action) 'Roberts Reads Bible'", as shown at 15. Said musical strains and the complete "theme" composition are also preferably respectively identified by an indication of the musical composition from which the strain and "theme" is taken, as, for instance, "Selection: 'Lakme' (Delibes)", "Selection: 'Consolation' (Mendelssohn)" as shown at 16. Complete identification is thus afforded the musician as well as synchronization with the picture titles or scenes and actions.

The successive partial musical strains and the complete "theme" composition are also further synchronized with the scenes and actions in the run or showing of the picture by an indication, respectively provided with relation to each strain and "theme" of the period of time the strain and "theme" is to be played, as, for instance "(1 min.)", "(½ min.)", as shown at 17; and, associated with such time indication, there is also preferably imprinted suitable instructions or directions, as, for instance, "Play till next change.", as shown at 18.

Supplementary to the partial musical strains as above described, the improved cue sheet is provided with an imprint of the entire musical composition appropriate to the mood of the picture and serving as the main "theme" thereof, said composition being indicated at 19, and being identified in the present illustration by the No. 8 and by the title "'A Song of India' (Rimsky Koraskow)", the complete musical composition serving as the main "theme" for the picture being indicated by the further title "Theme" as shown at 20.

The advantages of my improved thematic music cue sheet, and its service in application to the run or showing of moving pictures and synchronized relation thereto, will be readily understood by those skilled in the art to which the invention appertains. It provides a positive and efficient medium whereby a musician can correctly and conveniently apply the musical compositions or parts thereof, or substitutions, which are appropriate to and respectively meet and synchronize with each and every scene and action or particular mood of the motion picture, as well as the main theme or nature or mood thereof.

It will be understood that the partial musical strains are only a short excerpt from the musical composition to which they relate, and are of less duration than the entire musical period required for the scene or action with which they are identified, the duration of the partial musical strains being only sufficient to enable appropriate substitution or improvisation by the musician or player, it being the purpose of the few notes of the partial strain to only afford an immediate and visual guide to the player of the appropriate musical strain or mood for correct and accurate playing in substitution or improvisation. The "theme" musical composition, supplementary to and in combination with said partial musical strains, and which constitutes the main music serving as the "theme" for the picture, is itself imprinted in full, the music of the main "theme" composition being entire or complete, to afford the full musical strain or mood of the theme, and the complete theme composition is thus afforded to be played at appropriate indicated points or at certain scenes or actions without substitution or improvisation. The full and complete score of the "theme" musical composition, supplementary to said partial musical strains for respective scenes or actions, thus affords to the player an accurate guide to the governing "theme" music which prevails in and is appropriate to the picture.

I do not desire to be understood as limiting myself to the detail features of indicating data or arrangement of the related musical strains or compositions as herein shown and described, as it is manifest that variations and modifications therein may be resorted to, in the adaptation of my invention and varying conditions of use, without departing from the spirit and scope of the invention and improvements. I therefore reserve the right to all such variations and modifications as properly fall within the scope of my invention and the terms of the following claims.

Having thus described my invention, I claim and desire to secure by Letters Patent.

1. A music cue sheet for motion pictures, provided with an imprint of a partial musical strain for respective scenes or actions of the picture and an imprint of a main musical composition serving as the theme for the picture.

2. A music cue sheet for motion pictures, provided with an imprint of a partial musical strain for respective scenes or actions of the picture, said partial musical strains being respectively identified by the title of the musical composition to which they are related, and an imprint of a main musical composition serving as the theme for the picture.

3. A music cue sheet for motion pictures, provided with an imprint of a partial musical strain for respective scenes or actions of the picture, said partial musical strains being respectively identified by the title of the scene or action to which they relate and by the title of the musical composition to which they are related, and an imprint of a main musical composition serving as the theme for the picture.

4. A music cue sheet for motion pictures, provided with an imprint of a partial musical strain for respective scenes or actions of the picture and of sufficient duration to enable appropriate substitution or improvisation by the player, and an imprint of an entire musical composition serving as the theme for the picture.

5. A music cue sheet for motion pictures, provided with an imprint of a partial musical strain for respective scenes or actions of the picture, said partial strains being of less duration than the entire musical period required for the scene or action and of sufficient duration to enable appropriate substitution of improvisation by the player, and with an imprint of a main musical composition serving as the theme for the picture.

In testimony whereof I have signed the foregoing specifications.

MOSES J. MINTZ.